United States Patent
Ferrel

(10) Patent No.: US 11,603,789 B1
(45) Date of Patent: Mar. 14, 2023

(54) VEHICLE HEATING SYSTEM

(71) Applicant: Ford Global Technologies, LLC, Dearborn, MI (US)

(72) Inventor: Mark Ferrel, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/654,144

(22) Filed: Mar. 9, 2022

(51) Int. Cl.
   *F01N 9/00* (2006.01)
   *B60H 1/22* (2006.01)
   *F01N 3/20* (2006.01)
   *B60R 16/033* (2006.01)

(52) U.S. Cl.
   CPC ............. *F01N 9/00* (2013.01); *B60H 1/2218* (2013.01); *B60H 1/2226* (2019.05); *F01N 3/2013* (2013.01); *B60R 16/033* (2013.01); *F01N 2900/08* (2013.01); *F01N 2900/104* (2013.01); *F01N 2900/1602* (2013.01)

(58) Field of Classification Search
   CPC ...... F01N 9/00; F01N 3/2013; F01N 2900/08; F01N 2900/104; F01N 2900/1602; B60H 1/2218; B60H 1/2226; B60R 16/033
   See application file for complete search history.

(56) References Cited

U.S. PATENT DOCUMENTS

| | | | |
|---|---|---|---|
| 10,946,854 B2 | 3/2021 | Nawata | |
| 11,161,389 B2 | 11/2021 | Watanabe | |
| 2010/0280698 A1* | 11/2010 | Ichikawa | B60L 1/04 180/65.21 |
| 2012/0199314 A1 | 8/2012 | Mihama et al. | |
| 2016/0229362 A1* | 8/2016 | Brutus | H02K 7/1815 |

* cited by examiner

*Primary Examiner* — Brandon D Lee
(74) *Attorney, Agent, or Firm* — David Kelley; McCoy Russell LLP

(57) ABSTRACT

Systems and methods for operating a hybrid vehicle are presented. In one example, electric current may be supplied to or withheld from a positive temperature coefficient (PTC) heater and an electrically heated catalyst. In particular, electric current may be delivered to the PTC heater and withheld from the electrically heated catalyst, or vice-versa, in response to a catalyst temperature and battery state of charge.

18 Claims, 5 Drawing Sheets

VEHICLE HEATING SYSTEM

FIELD

The present description relates to methods and a system for reducing cost and complexity of a vehicle heating system. The methods and system may be particularly useful for hybrid vehicles that include an engine and a passenger cabin heating system.

BACKGROUND AND SUMMARY

A hybrid vehicle may include an engine and an electrically heated catalyst that is part of the engine's exhaust system. The electrically heated catalyst may help to reduce emissions from an engine before the engine has had a sufficient amount of time to heat the catalyst. In particular, the electrically heated catalyst may be activated before an engine is started and after the engine is started so that catalyst efficiency may be improved. However, the electrically heated catalyst may require a higher voltage (e.g., greater than 400 volts) and a large amount of electric current when it is activated.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
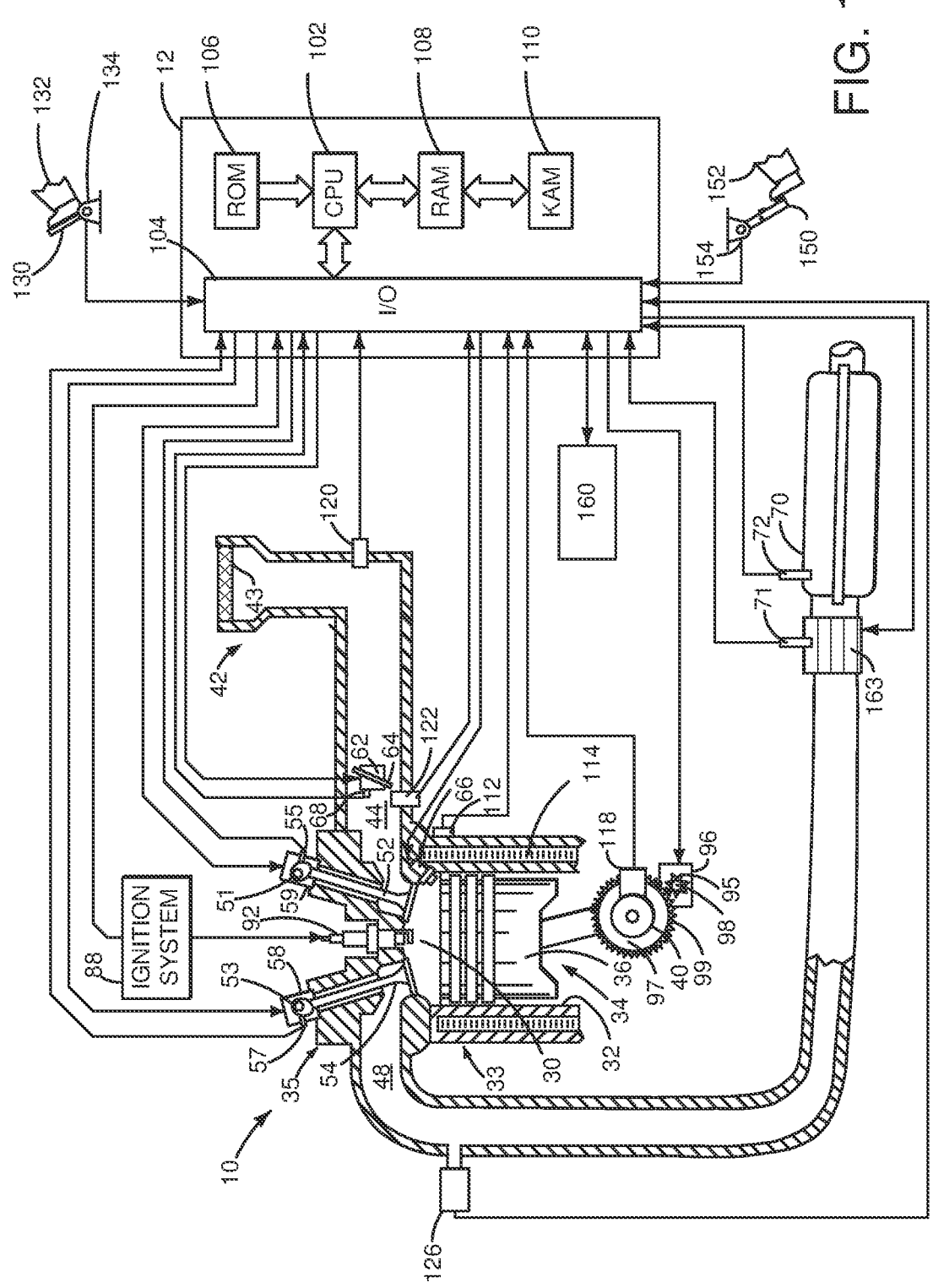
FIG. 1 is a schematic diagram of an engine.
Figure 2:
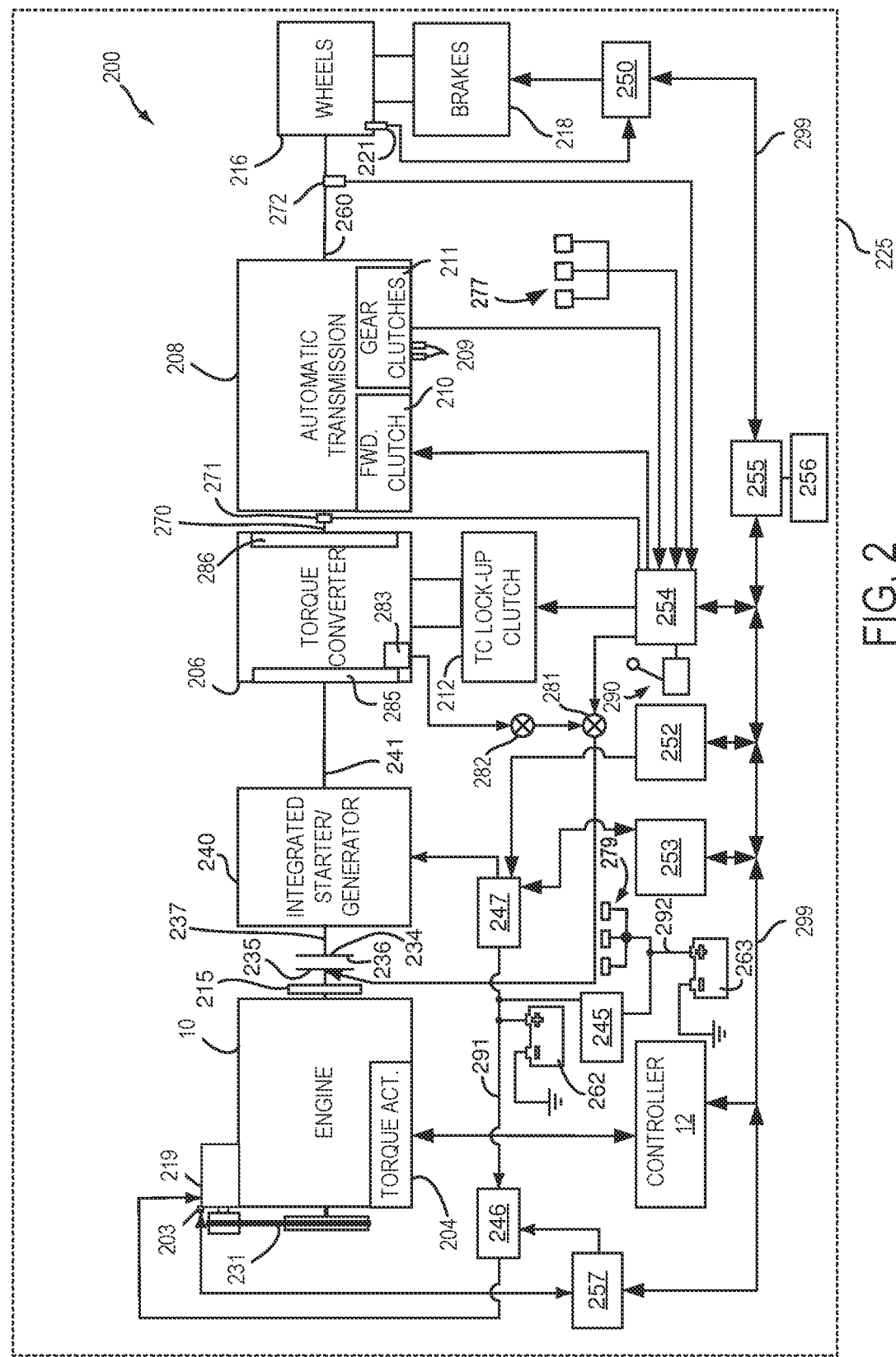
FIG. 2 is a schematic diagram of a hybrid vehicle driveline including the engine of FIG. 1.
Figure 3:
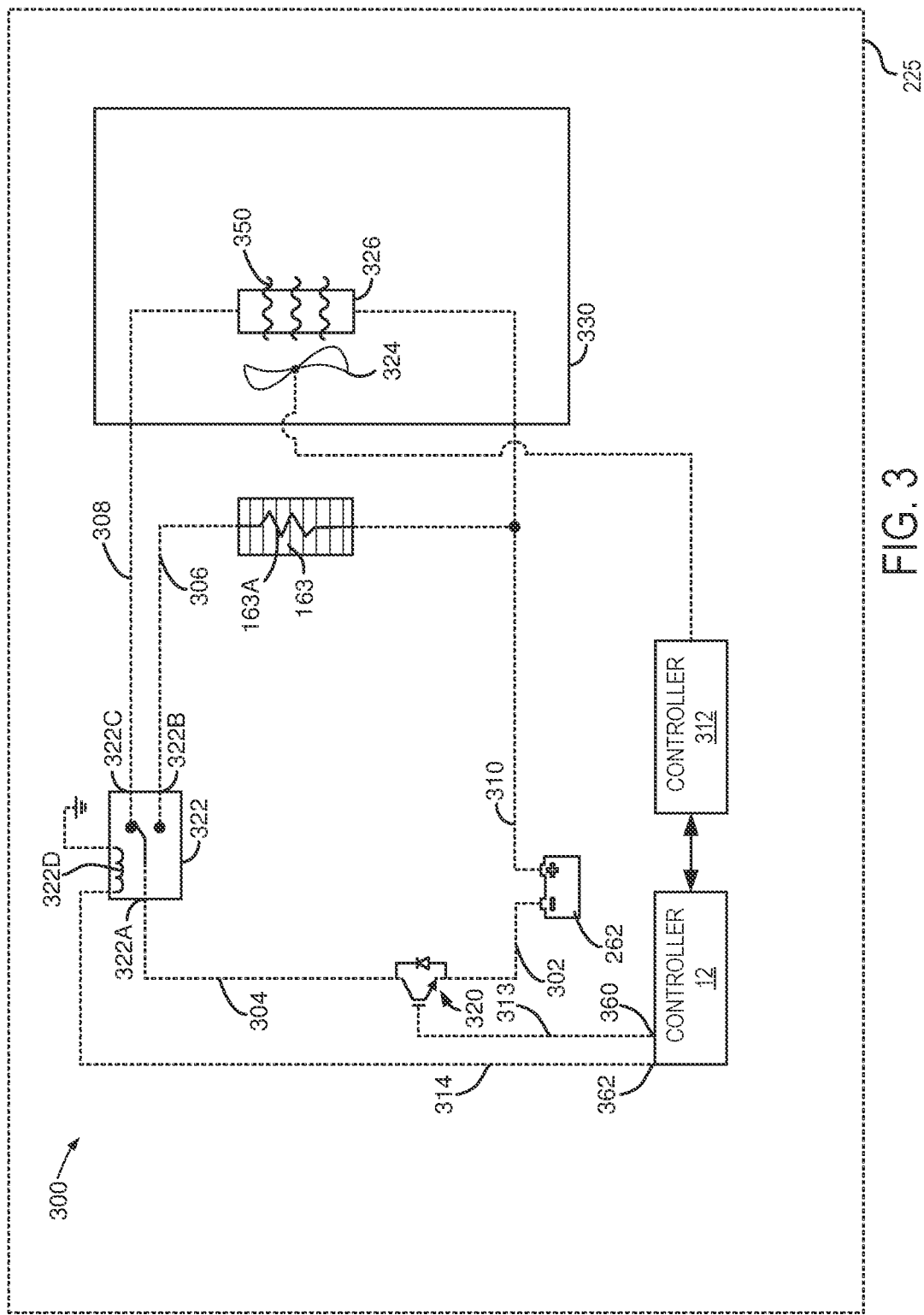
FIG. 3 is a schematic of an example electrical system for operating the hybrid vehicle driveline.
Figure 4:
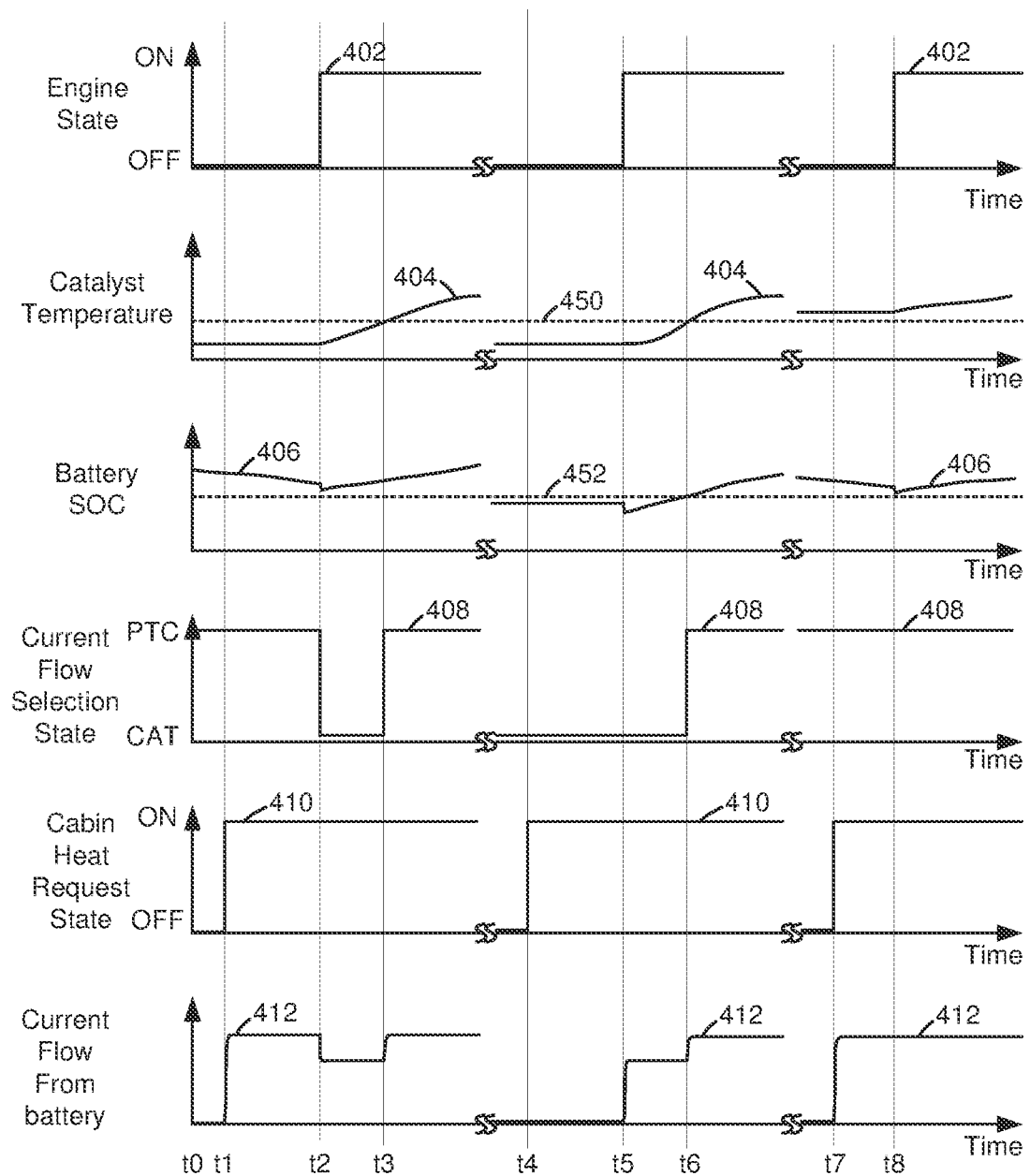
FIG. 4 is an example operating sequence for operating the hybrid vehicle driveline.

The present description is related to reducing cost of a vehicle heating system while providing a high level of functionality. The vehicle may include a heating system for heating a catalyst to reduce engine emissions. The vehicle may also include a positive temperature coefficient heater (PTC) for warming a passenger cabin. The vehicle may include an engine of the type that is shown in FIG. 1. The engine may be part of a hybrid powertrain or driveline as shown in FIG. 2. The vehicle may include an electrical system as shown in FIG. 3 for heating a catalyst and a passenger cabin. The vehicle heating system may be operated as shown in FIG. 4. The vehicle and vehicle heating system may be operated according to the method of FIG. 5.

A hybrid vehicle may operate with one or more electric machines propelling the hybrid vehicle in an "electric only" mode. The one or more electric machines may consume electric energy from a battery or other electric energy storage device while propelling the vehicle. Since the vehicle's engine does not operate in "electric only" mode, the vehicle may be equipped with a PTC heater. The PTC heater may be activated to heat a passenger cabin or compartment. The PTC heater may operate at a higher voltage and a higher current. The hybrid vehicle may also include an engine that may be started when the state of charge of the battery is low or when there is a high power demand. However, the engine's exhaust gases may not be converted efficiently if a temperature of a catalyst in the engine's exhaust system is less than a threshold temperature. Therefore, it may be desirable to heat the catalyst via an electrically powered catalyst heater. Yet, the vehicle's battery may lack capacity to heat the catalyst while heating the passenger cabin. One way to cure this deficiency may be to install two batteries, but this solution may significantly increase system cost.

The inventor herein has recognized the above-mentioned issues and has developed a vehicle operating method, comprising: operating a first output of a controller in a first state to permit electric current flow to a catalyst heater, and operating the first output of the controller in a second state to permit electric current flow to a passenger cabin heater; and operating a second output of the controller to activate the catalyst heater or the passenger cabin heater.

By separately controlling a catalyst heater and a passenger cabin heater via a single output of a controller, it may be possible to provide the technical result of reducing vehicle system cost by supplying to two heating sources with electrical current via a single battery. In addition, since the two heating sources are controlled via a single controller output, the possibility of activating both heaters at a same time may be reduced so that the battery may operate as expected.

The present description may provide several advantages. In particular, the approach may reduce vehicle cost. Further, the approach may improve vehicle emissions during cold engine starting. Additionally, the approach may help to keep electric current draw from a battery within desired limits.

The above advantages and other advantages, and features of the present description will be readily apparent from the following Detailed Description when taken alone or in connection with the accompanying drawings.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be hydraulic and/or electromechanical devices.

Fuel injector 66 is shown positioned to inject fuel directly into cylinder 34, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with engine air intake 42. Optional electronic throttle 62 adjusts a position of throttle plate 64 to control air flow from engine air intake 42 to intake manifold 44. In some examples, throttle 62 and throttle plate 64 may be positioned between intake valve 52 and intake manifold 44 such that throttle 62 is a port throttle. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of electrically heated catalyst 163 and catalytic converter 70. Alternatively, a two-state exhaust gas oxygen sensor may be substituted for UEGO sensor 126.

Catalytic converter 70 can include multiple catalyst bricks, in one example. In another example, multiple emission control devices, each with multiple bricks, can be used. Catalytic converter 70 can be a three-way type catalyst in one example. Temperature of catalytic converter 70 (e.g., catalyst) may be monitored via temperature sensor 72. Temperature of electrically heated catalyst 163 may be monitored via temperature sensor 71.

Controller 12 may receive input data from and provide output data to human/machine interface 160. Human/machine interface 160 may be a touch screen display, key board, or other known interface. Controller 12 may provide and display system status information via human/machine interface 160. A human user may input requests for powertrain and passenger cabin climate controls to human/machine interface 160.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an driver demand pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a position sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, first electric machine controller 252, second electric machine controller 257, transmission controller 254, energy storage device controller 253, and brake controller 250. The controllers may communicate over controller area network (CAN) 299. In addition, vehicle system controller 255 may communicate with communications system 256 (e.g., a transceiver) so that vehicle 225 may communicate with a remote server (not shown) via cellular network, satellites, vehicle to vehicle communications network, or other radio frequency communications system. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver (human or autonomous) releasing a driver demand pedal and vehicle speed, vehicle system controller 255 may request a desired wheel power or a wheel power level to provide a desired rate of vehicle speed reduction. The requested desired wheel power may be provided by vehicle system controller 255 requesting a first braking power from electric machine controller 252 and a second braking power from engine controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or increase speed of the driveline and wheel rotation.

In other examples, the partitioning of controlling powertrain devices may be partitioned differently than is shown in FIG. 2. For example, a single controller may take the place of vehicle system controller 255, engine controller 12, first electric machine controller 252, second electric machine controller 257, transmission controller 254, and brake controller 250. Alternatively, the vehicle system controller 255 and the engine controller 12 may be a single unit while the electric machine controller 252, the transmission controller 254, and the brake controller 250 are standalone controllers.

In this example, powertrain 200 may be powered by engine 10 and electric machine 240. In other examples, engine 10 may be omitted. Engine 10 may be started with an engine starting system shown in FIG. 1, via belt integrated starter/generator BISG 219, or via driveline integrated starter/generator (ISG) 240 also known as an integrated starter/generator. A temperature of BISG 219 may be determined via optional BISG temperature sensor 203. Driveline ISG 240 (e.g., high voltage (operated with greater than 30 volts) electrical machine) may also be referred to as an electric machine, motor, and/or generator. Further, power of engine 10 may be adjusted via power actuator 204, such as a fuel injector, throttle, etc.

Driveline 200 is shown to include a belt integrated starter/generator (ISG) 219. ISG 219 may be coupled to crankshaft 40 of engine 10 via a belt 231. Alternatively, ISG 219 may be directly coupled to crankshaft 40. ISG 219 may provide a negative torque to driveline 200 when charging higher voltage electric energy storage device 262 (e.g., a traction battery). ISG 219 may also provide a positive torque to rotate driveline 200 via energy supplied by lower voltage electric energy storage device (e.g., a battery or capacitor) 263. In one example, electric energy storage device 262 may output a higher voltage (e.g., 48 volts) than electric energy storage device 263 (e.g., 12 volts). DC/DC converter 245 may allow exchange of electrical energy between high voltage bus 291 and low voltage bus 292. High voltage bus 291 is electrically coupled to inverter 246 and higher voltage electric energy storage device 262. Low voltage bus 292 is electrically coupled to lower voltage electric energy storage device 263 and sensors/actuators/accessories 279. Electrical accessories 279 may include but are not limited to front and rear windshield resistive heaters, vacuum pumps, climate control fans, and lights. Inverter 246 converts DC power to AC power and vice-versa to enable power to be transferred between ISG 219 and electric energy storage device 262. Likewise, inverter 247 converts DC power to AC power and vice-versa to enable power to be transferred between ISG 240 and electric energy storage device 262.

An engine output power may be transmitted to an input or first side of driveline disconnect clutch 235 through dual mass flywheel 215. Driveline disconnect clutch 236 may be hydraulically actuated via fluid (e.g., oil) that is pressurized via pump 283. A position of valve 282 (e.g., line pressure control valve) may be modulated to control a pressure (e.g., a line pressure) of fluid that may be supplied to driveline disconnect clutch pressure control valve 281. A position of valve 281 may be modulated to control a pressure of fluid that is supplied to driveline disconnect clutch 235. The downstream or second side 234 of disconnect clutch 236 is shown mechanically coupled to ISG input shaft 237.

ISG 240 may be operated to provide power to powertrain 200 or to convert powertrain power into electrical energy to be stored in electric energy storage device 262 in a regeneration mode. ISG 240 is in electrical communication with energy storage device 262. ISG 240 has a higher output power capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 262 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC is locked. TCC is electrically operated by controller 254. Alternatively, TCC may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power directly transferred to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches 211 (e.g., gears 1-10) and forward clutch 210. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

A frictional force may be applied to wheels 216 by engaging friction brakes 218. In one example, friction brakes 218 for wheels 216 may be engaged in response to a human driver pressing their foot on a brake pedal (not shown) and/or in response to instructions within brake controller 250. Further, brake controller 250 may apply friction brakes 218 in response to information and/or requests made by vehicle system controller 255. In the same way, a frictional force may be reduced to wheels 216 by disengaging friction brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure. A braking torque may be determined as a function of brake pedal position.

In response to a request to increase a speed of vehicle 225, vehicle system controller may obtain a driver demand power or power request from a driver demand pedal or other device. Vehicle system controller 255 then allocates a fraction of the requested driver demand power to the engine and the remaining fraction to the ISG or BISG. Vehicle system controller 255 requests the engine power from engine controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 262, a charging power (e.g., a negative ISG power) may be requested while a non-zero driver demand power is present. Vehicle system controller 255 may request increased engine power to overcome the charging power to meet the driver demand power.

In response to a request to reduce a speed of vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the ISG 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears based on a unique shifting schedule to increase regeneration efficiency. Engine 10 and ISG 240 may supply a negative power to transmission input shaft 270, but negative power provided by ISG 240 and engine 10 may be limited by transmission controller 254 which outputs a transmission input shaft negative power limit (e.g., not to be exceeded threshold value). Further, negative power of ISG 240 may be limited (e.g., constrained to less than a threshold negative threshold power) based on operating conditions of electric energy storage device 262, by vehicle system controller 255, or electric machine controller 252. Any portion of desired negative wheel power that may not be provided by ISG 240 because of transmission or ISG limits may be allocated to engine 10 and/or friction brakes 218 so that the desired wheel power is provided by a combination of negative power (e.g., power absorbed) via friction brakes 218, engine 10, and ISG 240.

Accordingly, power control of the various powertrain components may be supervised by vehicle system controller 255 with local power control for the engine 10, transmission 208, electric machine 240, and friction brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft rate of speed change. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, gear shift lever sensors, and ambient temperature sensors. Transmission controller 254 may also receive requested gear input from gear shift selector 290 (e.g., a human/machine interface device). Gear shift selector 290 may include positions for gears 1-N (where N is an upper gear number), D (drive), and P (park).

Brake controller 250 receives wheel speed information via wheel speed sensor 221 and braking requests from vehicle system controller 255. Brake controller 250 may also receive brake pedal position information from position sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 N-m, ISG power is adjusted to provide less than 50 N-m (e.g., 49 N-m) of negative power at the wheels, including accounting for transmission gearing.

Thus, the system of FIGS. 1 and 2 provides for a system, comprising: an engine including an exhaust system having an electrically heated catalyst; a positive temperature coefficient (PTC) heater configured to heat air within a passenger cabin of a vehicle; a battery; a single throw double pole relay coupled to the electrically heated catalyst and the PTC heater; a transistor coupled to the single throw double pole relay and the battery; and a controller including executable instructions stored in non-transitory memory that cause the controller operate the single throw double pole relay in a first state in response to a temperature of the electrically heated catalyst and an engine start request, and additional instructions to operate the single throw double pole relay in a second state in response to the engine running. In a first example, the system includes where the electrically heated catalyst is electrically in parallel with the PTC heater. In a second example that may include the first example, the system further comprises electrically coupling the controller to the single throw double pole relay. In a third example that may include one or both of the first and second examples, the system includes where the controller is electrically coupled to a coil of the single throw double pole relay. In a fourth example that may include the first through third examples, the system includes where the battery is electrically coupled to the PTC heater and the electrically heated catalyst. In a fifth example that may include the first through fourth examples, the system further comprises electrically coupling the controller to the transistor. In a sixth example, that may include the first through fifth examples, the system further comprises electrically coupling the battery to the transistor.

Referring now to FIG. 3, an example heating system 300 for vehicle 225 is shown. In this example, a climate control system controller 312 may communicate with controller 12 (shown in FIG. 1) via CAN 299. Climate control system controller 312 may adjust a speed of fan 324 to control a flow of air 350 over PTC heater 326 to heat air in passenger cabin 330. Controller 12 may operate transistor 320 and relay 322 to control flow of electric power from electric energy storage device 262 to electrically heated catalyst 163 and PTC heater 326.

Electric energy storage device 262 is electrically coupled to transistor 320 via conductor 302. Transistor 320 may be normally off and closed to prevent electric current flow between electric energy storage device 262, electrically heated catalyst 163, and PTC heater 326. Electrically heated catalyst 163 is shown with an electric heater 163A. Transistor 320 is electrically coupled to single throw double pole relay 322 via conductor 304. In addition, output 360 of controller 12 is coupled to transistor 320 via conductor 313, and output 362 of controller 12 is electrically coupled to coil 322D of single throw double pole relay 322 via conductor 314. Transistor 320 is electrically coupled to wiper input 322A of single pole double throw relay 322. Terminal 322B is electrically coupled to electrically heated catalyst 163 via conductor 306. Terminal 322C is electrically coupled to PTC heater 326 via conductor 308.

In this example, single throw double pole relay 322 is shown with terminal 322C in a normally closed state such that electric current may flow through terminal 322C when current does not flow through coil 322D, and when transistor 320 is commanded on or closed. Terminal 322B is in a normally open state such that electric current may not flow through terminal 322B when current does not flow through coil 322D, and when transistor 320 is commanded on or closed. Thus, in the state shown, electric current may flow only through PTC heater 326 when transistor 320 is commanded on or open. However, if electric current flows through coil 322D, the operating state of single throw double pole relay 322 may change to permit electric current to flow through electrically heated catalyst 163. Single throw double pole relay 322 prevents electric current flow through electrically heated catalyst 163 when electric current flows to PTC heater 326 and vice-versa. By preventing electric current from flowing to electrically heated catalyst 163 and single throw double pole relay 322 simultaneously, the electrical load on the electric energy storage device 262 may be controlled so as to reduce a possibility of over loading the electric energy storage device 262. Additionally, system cost may be reduced since electric energy storage device 262 may power both the electrically heated catalyst 163 and the PTC heater.

Referring now to FIG. 4, a prophetic driveline operating sequence is shown. The operating sequence of FIG. 4 may be provided via the system of FIGS. 1-3 in cooperation with the method of FIG. 5. The vertical lines at times t0-t8 represent times of interest during the operating sequence. The plots are time aligned. The double SS marks along the horizontal axes represent breaks in time and the breaks may be long or short in duration.

The first plot from the top of FIG. 4 is a plot of engine operating state versus time. The vertical axis represents engine operating state (e.g., on—rotating and combusting air and fuel; or off—not combusting air and fuel, but may or may not be rotating). The engine is off when the trace is at a lower level near the horizontal axis. The engine is on when the trace is at a higher level near the vertical axis arrow. The horizontal axis represents time and time increases from the left side of the plot to the right side of the plot. Trace 402 represents engine state.

The second plot from the top of FIG. 4 is a plot of catalyst temperature versus time. The vertical axis represents catalyst temperature and catalyst temperature increases in the direction of the vertical axis arrow. The horizontal axis represents time and time increases from the left side of the plot to the right side of the plot. Trace 404 represents catalyst temperature. Horizontal line 450 represents a threshold catalyst temperature below which the catalyst heater may be activated if the engine is not started.

The third plot from the top of FIG. 4 is a plot of battery state of charge versus time. The battery state of charge increases in the direction of the vertical axis arrow. The battery state of charge is zero at the level of the horizontal axis. The horizontal axis represents time and time increases from the left side of the plot to the right side of the plot. Trace 406 represents battery state of charge. Horizontal line 452 represents a threshold battery state of charge below which the PTC heater may not be activated if the engine is not started.

The fourth plot from the top of FIG. 4 is a plot of an electric current flow selection state versus time. The vertical axis represents the electric current flow selection state and electric current may flow to the PTC heater when trace 408 is near the level of the label "PTC" located along the vertical axis. Electric current may flow to the electrically heated catalyst when trace 408 is near the level of the label "CAT" located along the vertical axis. The horizontal axis represents time and time increases from the left side of the plot to the right side of the plot. Trace 408 represents electric current flow state. An operating state of a relay (e.g., single throw double throw relay 322) may control the electric current flow selection state.

The fifth plot from the top of FIG. 4 is a plot of a passenger cabin heating request state versus time. The vertical axis represents the passenger cabin heating request state and passenger cabin heating is requested when trace 410 is at a higher level near the vertical axis arrow. Passenger cabin heating is not requested when trace 410 is at a lower level near the horizontal axis. The horizontal axis represents time and time increases from the left side of the plot to the right side of the plot. Trace 410 represents the passenger cabin heating request state.

The sixth plot from the top of FIG. 4 is a plot of electric current flow from an electric energy storage device (e.g., battery) to the electrically heated catalyst and the PTC heater versus time. The vertical axis represents an amount of electric current flow and the amount of electric current flow increases in the direction of the vertical axis arrow. The horizontal axis represents time and time increases from the left side of the plot to the right side of the plot. Trace 412 represents an amount of electric current flow from the battery to the PTC heater and the electrically heated catalyst.

At time t0, the engine is off and the catalyst temperature is less than threshold 450. The battery SOC is above threshold 452 and relay is in a state to permit electric current flow to the PTC heater. The passenger cabin heating request is not asserted and electric current flow from the battery to the PTC heater and the electrically heated catalyst is zero.

At time t1, a passenger cabin heating request is asserted causing the controller to activate the PTC heater. The electric current from the battery increases and the battery state of charge (SOC) begins to decline. The engine remains off and catalyst temperature remains below threshold 450. Electric current flow from the battery is directed to the PTC heater and it is prevented from the electrically heated catalyst.

At time t2, an engine start request is generated. The electric current flow from the battery is directed away from the PTC heater and to the electrically heated catalyst. Electric current flow to the PTC heater is prevented in response to the engine start request. The electric current flow from the battery is reduced since the electrically heated catalyst in this example consumes less power than the PTC heater. The passenger cabin heat request remains asserted and speed of the climate control system fan (not shown) may be reduced. The battery SOC begins to increase shortly after the engine is started in response to the engine start request. The catalyst temperature is low but it begins increasing in response to the engine start request.

At time t3, catalyst temperature exceeds threshold temperature 450. The electric current flow from the battery is directed away from the electrically heated catalyst and to the PTC heater in response to the catalyst temperature exceeding threshold 450. The battery SOC continues to increase and the passenger cabin heating request remains asserted. The electric current flow from the battery increases since the PTC heater is activated. A break in the sequence occurs after time t3.

Just before time t4, the engine is off and the catalyst temperature is less than threshold 450. The battery SOC is below threshold 452 and relay is in a state to permit electric current flow to the electrically heated catalyst. The passenger cabin heating request is not asserted and electric current flow from the battery to the PTC heater and the electrically heated catalyst is zero.

At time t4, a passenger cabin heating request is asserted, but the controller does not activate the PTC heater because of the low SOC. The electric current from the battery does not increase because SOC is low and current is not supplied to the PTC heater. The engine remains off and catalyst temperature remains below threshold 450. Electric current flow from the battery is zero and it is prevented from the PTC heater and the electrically heated catalyst.

At time t5, an engine start request is generated. The electric current flow from the battery is directed away from the PTC heater and to the electrically heated catalyst. Electric current flow to the PTC heater is prevented in response to the engine start request. The electric current flow from the battery increases. The passenger cabin heat request remains asserted and the battery SOC begins to increase shortly after the engine is started in response to the engine start request. The catalyst temperature is low but it begins increasing in response to the engine start request.

At time t6, catalyst temperature exceeds threshold temperature 450. The electric current flow from the battery is directed away from the electrically heated catalyst and to the PTC heater in response to the catalyst temperature exceeding threshold 450. The battery SOC continues to increase and the passenger cabin heating request remains asserted. The electric current flow from the battery increases since the PTC heater is activated. A break in the sequence occurs after time t6.

Just before time t7, the engine is off and the catalyst temperature is greater than threshold 450. The battery SOC is above threshold 452 and relay is in a state to permit electric current flow to the PTC heater. The passenger cabin heating request is not asserted and electric current flow from the battery to the PTC heater and the electrically heated catalyst is zero.

At time t7, a passenger cabin heating request is asserted causing the controller to activate the PTC heater. The electric current from the battery to the PTC heater increases because the PTC heater is activated. The engine remains off and catalyst temperature remains above threshold 450. Electric current flow from the battery is prevented from reaching the electrically heated catalyst since the catalyst temperature is above threshold 450.

At time t8, an engine start request is generated. The electric current flow from the battery remains directed to the PTC heater and away from the electrically heated catalyst. The electric current flow from the battery remains constant. The passenger cabin heat request remains asserted and the battery SOC begins to increase shortly after the engine is started in response to the engine start request. The catalyst temperature begins increasing.

In this way, electric current from an electric energy storage device may be selectively delivered to an electrically heated catalyst or a PTC heater during an engine start. Electric current flow may be directed via a single relay and the PTC heater or electrically heated catalyst may be activated via a single transistor or switch. This may allow an amount of current that is drawn from a battery to remain within battery specifications.

Figure 5:
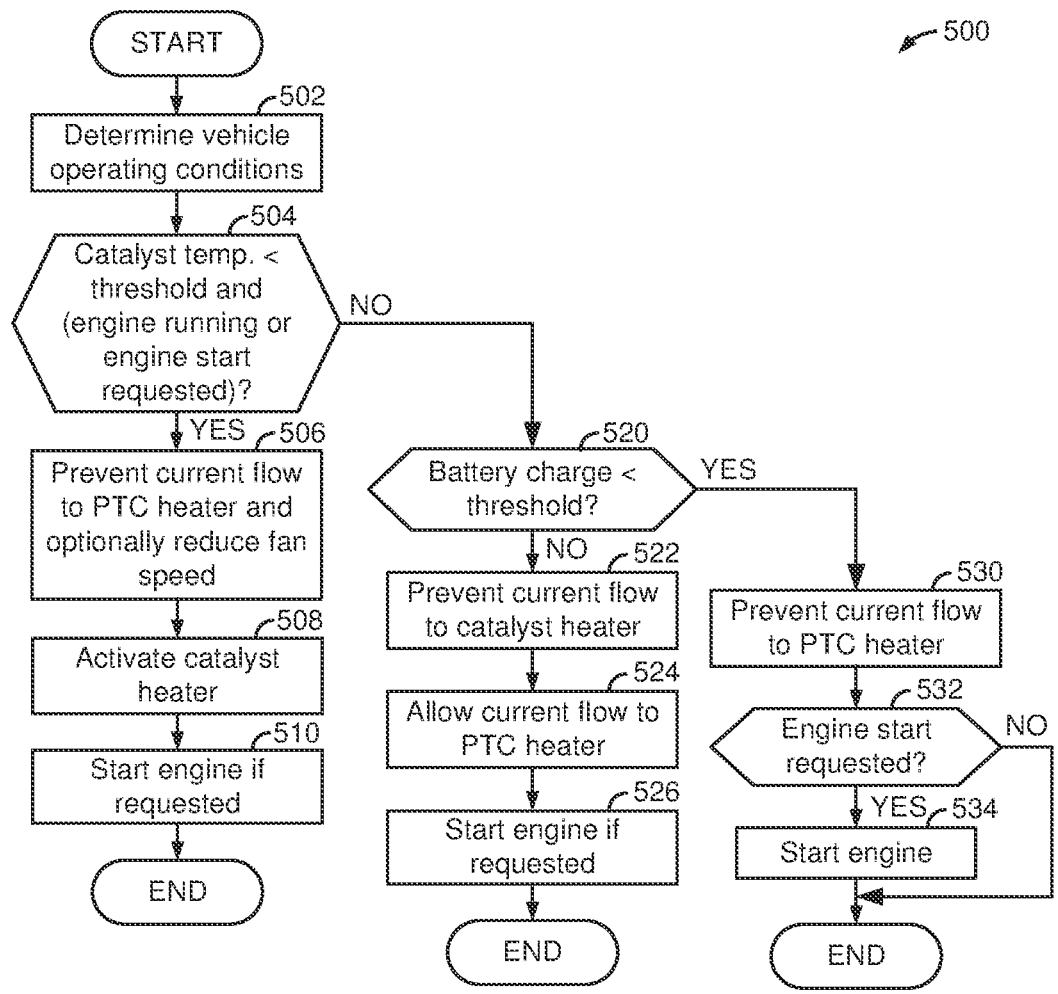
FIG. 5 is a method for operating the hybrid vehicle.

Referring now to FIG. 5, a method for operating a hybrid vehicle is shown. The method may be at least partially implemented as executable instructions stored in controller memory in the system of FIGS. 1 and 2. Further, the method may include actions taken in the physical world to transform an operating state of the system of FIGS. 1 and 2. Additionally, the method may provide the operating sequence shown in FIG. 3 and it may include instructions for operating the driveline at the conditions described herein.

At 502, method 500 determines vehicle operating conditions. Vehicle operating conditions may be determined via receiving inputs as shown in FIGS. 1 and 2 into a controller. Vehicle operating conditions may include but are not limited to engine operating state, catalyst temperature, ambient air temperature, engine speed, vehicle speed, and passenger cabin heating requests. Method 500 proceeds to 504 after vehicle operating conditions are determined.

At 504, method 500 judges if catalyst temperature is less than a threshold catalyst temperature and if the engine is running or an engine start is requested. This condition may be expressed as (cat_t<cat_threshold) AND (eng_strt OR eng_run), where cat_t is catalyst temperature, cat_threshold is a threshold catalyst temperature, AND is a logical "and" operation, eng_strt is an engine start request status indicator, OR is a logical "or" operation, and eng_run is an engine running status indicator. If so, the answer is yes and method 500 proceeds to 506. Otherwise, the answer is no and method 500 proceeds to 520.

At 506, method 500 prevents electric current flow to the PTC heater. In one example, method 500 prevents electric current flow to the PTC heater via setting an operating state of a relay such that electric current may not flow to the PTC heater and so that electric current may flow to the catalyst heater. Method 500 may also reduce a speed of a fan of a climate control system that may blow air over the PTC heater. By slowing the fan speed, cold air flow in the passenger cabin may be reduced when heating is being requested via the climate control system. As such, passenger comfort may be improved. Method 500 proceeds to 508.

At 508, method 500 activates the electrically heated catalyst. The electrically heated catalyst is activated to reduce engine emissions by improving catalyst efficiency. The catalyst efficiency may be increased via increasing a temperature of the catalyst. Method 500 proceeds to 510.

At 510, method 500 starts the engine if engine starting is requested. Method 500 may start the engine via rotating the engine via an electric machine while supplying spark and fuel to the engine. Method 500 proceeds to exit.

At 520, method 500 judges if the battery SOC is greater than a threshold battery SOC. If so, the answer is yes and method 500 proceeds to 530. Otherwise, the answer is no and method 500 proceeds to 522.

At 522, method 500 prevents electric current flow to the electrically heated catalyst. In one example, method 500 prevents electric current flow to the electrically heated catalyst via setting an operating state of a relay such that electric current may not flow to the electrically heated catalyst and so that electric current may flow to the PTC heater. Method 500 proceeds to 524.

At 524, method 500 allows electric current flow to the PTC heater and flows electric current to the PTC heater if passenger cabin heating is requested. Method 500 may activate a transistor to flow electric current to the PTC heater. Method 500 proceeds to 526.

At 526, method 500 starts the engine if an engine start is requested. Method 500 may start the engine via rotating the engine via an electric machine while supplying spark and fuel to the engine. Method 500 proceeds to exit.

At 530, method 500 prevents current flow to the PTC heater. In one example, method 500 prevents electric current flow to the PTC heater via setting an operating state of a relay such that electric current may not flow to the PTC heater and so that electric current may flow to the catalyst heater. Method 500 proceeds to 532.

At 532, method 500 judges whether or not an engine start is being requested. If so, the answer is yes and method 500 proceeds to 534. Otherwise, the answer is no and method 500 proceeds to exit.

At 534, method 500 starts the engine. Method 500 may start the engine via rotating the engine via an electric machine while supplying spark and fuel to the engine. Method 500 proceeds to exit.

Thus, the method of FIG. 5 provides for a vehicle operating method, comprising: operating a first output of a controller in a first state to permit electric current flow to a catalyst heater, and operating the first output of the controller in a second state to permit electric current flow to a passenger cabin heater; and operating a second output of the controller to activate the catalyst heater or the passenger cabin heater. In a first example, the vehicle operating method includes where the passenger cabin heater is a positive temperature coefficient (PTC) heater. In a second example that may include the first example, the vehicle operating method includes where the first state is activated via the controller in response to an engine start request. In a third example that may include one or both of the first and second examples, the vehicle operating method includes where the second state is activated in response to a catalyst temperature being greater than a threshold temperature or an absence of an engine start request. In a fourth example that may include one or more of the first through third examples, the vehicle operating method includes where the first output of the controller is coupled to a relay. In a fifth example that may include one or more of the first through fourth examples, the vehicle operating method includes where the second output is coupled to a transistor. In a sixth example that may include one or more of the first through fifth examples, the vehicle operating method further comprises operating the first output in response to a battery state of charge. In a seventh example that may include one or more of the first through sixth examples, the vehicle operating method further comprises monitoring a catalyst temperature and a battery state of charge via the controller and operating the first output in the first state in response to the catalyst temperature being less than a threshold temperature and the battery state of charge being less than a threshold charge amount when an engine is stopped.

The method of FIG. 5 also provides for a vehicle operating method, comprising: preventing electric current flow to a positive temperature coefficient (PTC) heater configured to heat a passenger cabin of a vehicle and allowing electric current flow to a catalyst heater via a controller in response to a battery state of charge being less than a threshold. In a first example, the vehicle operating method further comprises reducing a speed of a fan configured to blow air over the PTC heater in response to the battery state of charge. In a second example that may include the first example, the vehicle operating method further comprises preventing electric current flow to the PTC heater in response an engine not running. In a third example that may include one or both of the first and second examples, the vehicle operating method further comprises permitting current flow to the PTC heater in response to an engine running. In a fourth method that may include one or more of the first through third examples, the vehicle operating method further comprises preventing electric current flow to the PTC heater in further response to a temperature of a catalyst.

Note that the example control and estimation routines included herein can be used with various engine and/or vehicle system configurations. Further, the methods described herein may be a combination of actions taken by a controller in the physical world and instructions within the controller. At least portions of the control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A vehicle operating method, comprising:
    operating a first output of a controller in a first state to permit electric current flow to a catalyst heater, and operating the first output of the controller in a second state to permit electric current flow to a passenger cabin heater; and
    operating a second output of the controller to activate the catalyst heater or the passenger cabin heater, where the first output of the controller is coupled to a relay, and where the second output is coupled to a transistor.

2. The vehicle operating method of claim 1, where the passenger cabin heater is a positive temperature coefficient (PTC) heater.

3. The vehicle operating method of claim 1, where the first state is activated via the controller in response to an engine start request.

4. The vehicle operating method of claim 3, where the second state is activated in response to a catalyst temperature being greater than a threshold temperature or an absence of the engine start request.

5. The vehicle operating method of claim 1, further comprising operating the first output in response to a battery state of charge.

6. The vehicle operating method of claim 1, further comprising monitoring a catalyst temperature and a battery state of charge via the controller and operating the first output in the first state in response to the catalyst temperature being less than a threshold temperature and the battery state of charge being less than a threshold charge amount when an engine is stopped.

7. A system, comprising:
    an engine including an exhaust system having an electrically heated catalyst;
    a positive temperature coefficient (PTC) heater configured to heat air within a passenger cabin of a vehicle;
    a battery;
    a single throw double pole relay coupled to the electrically heated catalyst and the PTC heater;
    a transistor coupled to the single throw double pole relay and the battery; and
    a controller including executable instructions stored in non-transitory memory that cause the controller operate the single throw double pole relay in a first state in response to a temperature of the electrically heated catalyst and an engine start request, and additional instructions to operate the single throw double pole relay in a second state in response to the engine running.

8. The system of claim 7, where the electrically heated catalyst is electrically in parallel with the PTC heater.

9. The system of claim 8, further comprising electrically coupling the controller to the single throw double pole relay.

10. The system of claim 9, where the controller is electrically coupled to a coil of the single throw double pole relay.

11. The system of claim 10, where the battery is electrically coupled to the PTC heater and the electrically heated catalyst.

12. The system of claim 11, further comprising electrically coupling the controller to the transistor.

13. The system of claim 12, further comprising electrically coupling the battery to the transistor.

14. A vehicle operating method, comprising:
    preventing electric current flow to a positive temperature coefficient (PTC) heater configured to heat a passenger cabin of a vehicle and allowing electric current flow to a catalyst heater via a controller in response to a battery state of charge being less than a threshold via a single throw double pole relay coupled to the catalyst heater and the PTC heater.

15. The vehicle operating method of claim 14, further comprising reducing a speed of a fan configured to blow air over the PTC heater in response to the battery state of charge.

16. The vehicle operating method of claim 14, further comprising preventing electric current flow to the PTC heater in response an engine not running.

17. The vehicle operating method of claim 14, further comprising permitting current flow to the PTC heater in response to an engine running.

18. The vehicle operating method of claim 14, further comprising preventing electric current flow to the PTC heater in further response to a temperature of a catalyst.

* * * * *